United States Patent [19]

Frisch, Jr.

[11] Patent Number: 4,590,224
[45] Date of Patent: May 20, 1986

[54] SILOXANE-CONTAINING POLYISOCYANURATE

[75] Inventor: Kurt C. Frisch, Jr., Midland, Mich.

[73] Assignee: The Dow Chemical Company, Midland, Mich.

[21] Appl. No.: 642,451

[22] Filed: Aug. 20, 1984

[51] Int. Cl.$^4$ .............................................. C08G 18/00
[52] U.S. Cl. ...................................... 521/155; 528/14; 528/15; 528/16; 528/18; 528/20; 528/21; 528/23; 528/12; 528/28; 556/418; 556/423; 556/425
[58] Field of Search ........................ 528/28, 14, 15, 16, 528/18, 20, 21, 23, 12; 521/155; 556/418, 423, 425

[56] References Cited

U.S. PATENT DOCUMENTS

| | | | |
|---|---|---|---|
| 4,033,912 | 7/1977 | Keimann et al. | 528/28 |
| 4,234,697 | 11/1980 | Homan et al. | 528/28 |
| 4,335,219 | 6/1982 | Clarke et al. | 560/24 |
| 4,390,644 | 6/1983 | Clarke et al. | 521/117 |

*Primary Examiner*—Melvyn I. Marquis
*Attorney, Agent, or Firm*—Gary C. Cohn

[57] ABSTRACT

Siloxane modified isocyanurate polymers are disclosed which are the reaction product of a siloxane containing polyahl and a polyisocyanate in the presence of a catalyst for a trimerization of the isocyanate to form isocyanurate rings.

19 Claims, No Drawings

SILOXANE-CONTAINING POLYISOCYANURATE

BACKGROUND OF THE INVENTION

This invention relates to siloxane modified polyisocyanurates.

Polysiloxanes are a well known class of polymers which are useful as surfactants, elastomers coatings and the like. While these polysiloxanes have found great utility, it is often desirable to provide a harder polysiloxane for certain applications, especially coating applications.

Siloxanes are known additives in the manufacture of polyurethane, polyurea and polyisocyanurate foams. In such foams, the siloxane acts as a smoke suppressant, surfactant and/or cell control agent in the foaming process. Among the siloxanes known for this purpose are hydroxy-terminated siloxanes which react with the isocyanate in the formulation and are therefore incorporated into the polymer chain. However, the siloxane in these foams comprises only a very small fraction (10 percent or less by weight) of the polyols or polyamines used.

Polysiloxanes have also been used as the polyol in a polyurethane formulation. However, since equimolar amounts of polysiloxane polyol and polyisocyanate were used in making the polyurethane, essentially no isocyanurate groups were formed in the reaction. Polysiloxanes have not heretofore been used as the sole or principal component of the active hydrogen-containing material in a polyisocyanurate formulation.

SUMMARY OF THE INVENTION

The present invention is a siloxane-containing isocyanurate polymer. This polymer is a reaction product of (a) a polyahl or polyahl mixture comprising at least a substantial amount of a siloxane-containing polyahl containing at least two active hydrogen atoms other than SiOH hydrogen atoms per molecule and (b) a polyisocyanate. The siloxane-modified isocyanurate of this invention is prepared by reacting these components in the presence of a catalyst for the trimerization of at least a portion of the polyisocyanate to form isocyanurate rings.

Depending on the proportions of ingredients employed in the manufacture of the siloxane-modified isocyanurate polymer, this polymer has physical properties ranging from a very soft flexible elastomer to a very hard yet surprisingly flexible film. The siloxane-modified isocyanurate of this invention may be, if desired, foamed according to conventional processes.

DETAILED DESCRIPTION OF THE INVENTION

The siloxane-modified polyisocyanurate of this invention is a reaction product of (a) a polyahl mixture comprising at least a substantial proportion of a siloxane-containing polyahl (hereinafter called "siloxane polyahl") and (b) a polyisocyanate. This reaction is conducted in the presence of a trimerization catalyst for the isocyanate so that at least a portion of said isocyanate forms isocyanurate rings.

The siloxane polyahl employed herein contains one or more

units, wherein each R is independently hydrogen, lower alkyl, phenyl, benzyl and the like, with lower alkyl, especially methyl or ethyl being preferred on the basis of cost and availability. Said R group may contain inert substituents such as halogen, particularly fluorine atoms.

The siloxane polyahl also contains two or more active hydrogens other than Si—O—H hydrogens. "Active" hydrogens are defined herein as those sufficiently labile to react with an isocyanate group such that a covalent bond is formed between the siloxane polyahl and the isocyanate. If the active hydrogen is a hydroxyl hydrogen, this reaction forms a urethane group. A urea group is formed if the active hydrogen is from a primary or secondary amine. Besides hydroxyl- and amine-containing polyahls, a siloxane containing thiol(—SH), carboxylic acid (COOH), amide (CONH$_2$) and like groups is suitable herein.

As used herein, the term polyahl refers to a compound containing two or more active hydrogen atoms.

Exemplary siloxane polyahls suitably employed herein are represented by the structure

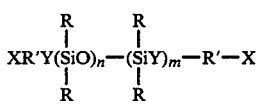

wherein n is an integer from about 1 to 10,000, Y represents a linkage between an R' group and a Si atom which may be, for example, a covalent bond, —O—, —S—, —COO— or other linking group, m is 0 or 1 and X is a functional group containing at least 1 active hydrogen atom. Each group R' is an inertly substituted organic diradical. By "inertly substituted" it is meant that the group R' contains no substituent groups which interfere with the reaction of the siloxane polyahl and the polyisocyanate or the trimerization reaction of the isocyanate to form an isocyanurate. Each group R is as defined hereinbefore.

The group R' is preferably an alkylene diradical such as methylene, ethylene, propylene and higher homologs thereof; a polyolefin chain such as a polyethylene or polypropylene chain; an arylene group such as phenylene, diphenylene, or a polyphenylene group corresponding to the formula

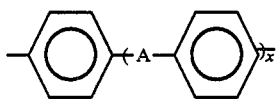

wherein A is an inertly substituted linking group which may be alkylene such methylene, ethylene, propylidene and the like; —O—, —S— and the like and x is an integer from 1 to about 1,000, and poly(oxyalkylene) corresponding to the formula

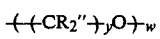

wherein each R'' is independently hydrogen or lower alkyl, y is an integer from about 2–12, and w is an integer from 1 to about 10,000.

Less preferably, the group R' is a polyamide or polyester chain. Polyamide chains can be grafted onto a polysiloxane by reacting the polysiloxane with a diamine and a diacid or a diacid chloride. Alternatively, a cyclic amide such as e-caprolactam can be reacted with a polysiloxane to form a polyamide chain thereon. Polyester chains are advantageously prepared by reacting the polysiloxane with a diacid or diacid chloride and a diol.

The groups X are functional groups containing at least 1 active hydrogen capable of reacting with a polyisocyanate so that a covalent bond is formed between the polyisocyanate and the siloxane polyahl. Any such functional group is useful herein but preferably X is hydroxyl, primary amine, secondary amine, thiol, amide ($CONH_2$ or $CONHR'''$ wherein $R'''$ is lower alkyl) and carboxylic acid). Most preferably, X is hydroxyl or a primary or secondary amine.

The linking group Y is preferably a covalent bond, ether or thioether group with the ether group and covalent bond being more preferred.

The value of n is from about 1 to 10,000. More generally, the value of n and the size of the groups R' are chosen so that the siloxane polyahl is readily processable in conventional urethane molding or foaming equipment. Preferably, the siloxane polyahl is a liquid at processing temperatures and the value of n and the groups R' are chosen accordingly. In general, the higher the value of n and the weight of the groups R', the higher the viscosity of the siloxane polyahl.

Although the polyahl may contain as few as one silicon atom, the presence of siloxane groups imparts desirable properties to the isocyanurate of this invention and the siloxane polyahl advantageously contains a substantial proportion of siloxane groups. Preferably, at least 10 percent by weight of siloxane polyahl is comprised of siloxane groups. More preferably, the siloxane groups comprise from about 10 to 99.5, more preferably 25 to 95 percent of the weight of siloxane polyahl.

Preferred siloxane polyahls are hydroxyl, or primary or secondary amine terminated poly(alkyleneoxide-b-dialkylsiloxane-b-alkyleneoxide)polymers. Such polymers are represented by the structure

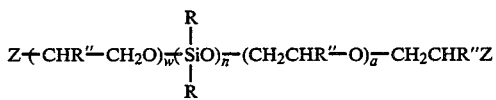

wherein R, R'', n and w are as defined hereinbefore, a is a number from 0 to 10,000 and Z is hydroxyl, primary or secondary amine or alkylene amino, i.e.,

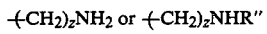

wherein z is an integer from 1 to about 5. The values of n, q and w are chosen such that the polyahl has a siloxane content from about 25 to 95 percent. Such siloxane polyahls are readily prepared by reacting the appropriate siloxane with an amount of an alkylene oxide (preferably ethylene or propylene oxide) sufficient to prepare a polyahl having the desired siloxane content. Amine or alkylene amino groups are introduced by aminating the resulting hydroxyl-terminated polyahl such as is described in U.S. Pat. Nos. 3,161,638; 3,231,619 or 3,236,895.

Other suitable siloxane polyahls include the reaction products of a cyclic polysiloxane and a $\alpha,\omega$-difunctional siloxane such as is disclosed in Yilgor et al. "Reactive Difunctional Siloxane Oligomers Synthesis and Characterization", *Polymeric Material Science and Engineering, Proceedings of the ACS Division*, 50, pp 518–522 (1984).

A polyisocyanate is also necessary to prepare the isocyanurate of this invention. A polyisocyanate, for the purpose of this invention, is any material having two or more isocyanate or isothiocyanate groups. The polyisocyanate used herein can be aliphatic, aromatic or a mixture thereof. Such aromatic polyisocyanates include p-phenylene diisocyanate, 2,6-toluene diisocyanate, diverse polymethylene polyphenylisocyanates, bitolulene diisocyanate, biphenyl diisocyanate, naphthylene-1,5-diisocyanate, bis(4-isocyanatophenyl)methane (MDI) and the like. Methylene-bridged polyphenyl polyisocyanates or mixtures thereof are also useful herein, particularly those having a functionality from about 2 to 4. Such methylene-bridged polyphenylene polyisocyanates can be prepared as described in U.S. Pat. No. 4,336,729.

Suitable aliphatic polyisocyanates include polymethylene diisocyanates such as 1,2-ethylene diisocyanate and 1,6-hexamethylene diisocyanate, cycloaliphatic diisocyanates as 1,4-cyclohexyl diisocyanate and 1,4-bis(isocyanomethyl)cyclohexane, mixtures thereof and the like. Of the aliphatic polyisocyanates, those having straight chains are preferred.

The relative proportions of siloxane polyahl and polyisocyanate use can vary greatly, depending on the properties desired in the product isocyanurate. In the urethane art, the proportion of isocyanate to polyahl is commonly expressed as the isocyanate index, defined as the number of equivalents of polyisocyanate per 100 equivalents of polyahl. Flexible, soft isocyanurates are prepared according to this invention by using an isocyanate index from about 80 to 700, preferably from about 105–700, more preferably from about 115 to 700. For harder, more rigid materials, higher isocyanate indexes are used. Materials of intermediate hardness are obtained when the isocyanate index is from about 400 to 700. An isocyanate index of 700 to 3,000 or more provides a very strong, rigid, solvent-resistant isocyanurate.

In addition to the polyisocyanate and siloxane polyahl, a catalyst for the trimerization of the polyisocyanate to form an isocyanurate ring is required. Such catalysts are well known in the art and include, for example, oxides such as $Li_2O$, $(Bu_3Sn)_2O$ and $R_3AsO$; alkoxides such as $NaOCH_3$, potassium t-butoxide and diverse borates; tertiary amines such as triethylamine, benzyldimethylamine and triethylenediamine; hydrides such as sodium borohydride, hydroxides of quarternary nitrogen, phosphorus, arsenic and antimony and diverse carboxylates, notably alkali metal carboxylates such as sodium formate, sodium benzoate, potassium acetate and alkali soaps as well as other carboxylates such as calcium diacetate, lead oleate and the like. Often the isocyanurate catalyst is present as an impurity in the siloxane polyahl. In such a case, it may not be necessary to add additional trimerization catalyst.

It is often desirable, although not always necessary, to employ a catalyst for the reaction between the siloxane polyahl and the polyisocyanate. Generally, any of the well-known urethane catalysts are useful herein including, for example, organometal compounds, tertiary amines, alkali metal alkoxides, mixtures thereof and the like.

Suitable organometal catalysts include, for example, organometal compounds of tin, zinc, lead, mercury, cadmium, bismuth, antimony, iron, manganese, cobalt, copper, vanadium, and the like, especially carboxylic acid salts of those metal, particularly carboxylic acid salts having from about 2 to 20 carbon atoms.

Suitable amine catalysts include, for example, triethylene diamine, triethylamine, tetramethylbutane diamine, N,N-dimethylethylenol amine, N-ethylmorpholine and the like.

Suitable alkali metal alkoxides which can be employed as catalysts for urethane formation include, for example, sodium methoxide, potassium oxide, sodium propoxide, potassium propoxide, sodium butoxide, alkali metal hydroxides such as sodium hydroxide and potassium hydroxide, alkali metal salts of polyols such as are described in U.S. Pat. No. 3,728,308, mixtures thereof and the like.

The trimerization catalyst, and urethane catalyst when employed, are each advantageously employed in quantities from about 0.001 to about 10, preferably about 0.01 to about 2 per hundred parts of polyahl employed, depending on the activity of the catalyst. Very weak catalysts can possibly be employed in greater quantities, say 10 parts per 100 parts polyahl or higher. In general, greater amounts of catalyst result in more rapid curing of the polymer and/or the ability to cure at lower temperatures. It has been found that in preparing coatings according to this invention, harder coatings are prepared when the catalyst level is increased.

Often the trimerization catalyst also functions as a urethane catalyst and no additional urethane catalyst is necessary.

The isocyanurate of this invention is prepared by mixing a siloxane polyahl, polyisocyanurate, an isocyanurate catalyst and optionally a urethane catalyst under conditions such that the siloxane polyahl and polyisocyanate react to form a siloxane modified polyisocyanurate. Generally, said reaction is conducted at ambient or elevated temperatures, i.e., about 15° to 200°, preferably 20° to 150° C. for a period of about 0.1 seconds to 5 hours or more depending on the amounts and types of catalysts employed and the reactivity of the siloxane polyahl and polyisocyanate. In most instances, a room temperature reaction proceeds sufficiently rapidly to be useful.

If desired, a minor portion of the siloxane polyahl may be prereacted with the polyisocyanate to form a prepolymer or quasi-prepolymer which is then reacted with the remainder of the siloxane polyahl. In preparing such prepolymer or quasi-prepolymer, the polyisocyanate is used in a large stoichiometric excess.

If desired, the reaction may be carried out in a closed mold (as for example, in the so-called RIM processes) or conventional molding and/or foaming equipment as is used for preparing polyurethanes. The selection of particular reaction conditions and equipment is considered an obvious matter of choice to those familar with the making of polyurethane or polyisocyanurate materials.

In addition to the critical ingredients described hereinbefore, various additional materials are advantageously employed in the siloxane-modified isocyanurates of this invention.

In addition to the siloxane polyahl, additional polyahl materials, particularly polyols and polyamines having active hydrogens are useful herein. Such polyahls include those conventionally employed in the preparation of polyurethanes and polyureas, including polyether polyols, polyester polyols, hydrocarbon derived polyols and the like having a functionality from about 2 to 8, preferably 2 to 3, and an average hydroxyl equivalent weight from about 200 to 10,000, preferably from about 1,000 to 5,000. Exemplary such polyols are described in U.S. Pat. No. 4,394,491, particularly columns 3–5 thereof. Also useful herein are those dispersions of addition copolymers, particularly of styrene and/or acrylonitrile in a continuous polyol phase commonly referred to as "copolymer polyols". Suitable copolymers polyols are described in U.S. Pat. Nos. RE 29,118, RE 28,715 and 4,394,491.

In addition to polyols, polyamines having an equivalent weight of about 200 to 10,000 and 2 to 8, preferably 2 to 3 functionalities are useful herein. Such polyamines are generally prepared from an appropriate polyfunctional initiator to which an alkylene oxide, especially ethylene oxide and/or propylene oxide, is added, following which the terminal hydroxyl groups are reductively aminated. U.S. Pat. No. 3,654,370 describes suitable such polyamines and processes for their preparation.

When such an optional polyahl is employed, the siloxane polyahl comprises a substantial proportion of the combined weight of the siloxane polyahl and optional polyahl. Preferably, the major portion of the polyahl mixture is the siloxane polyahl. Generally, the polyahl mixture contains sufficient of the siloxane polyahl that at least 10% preferably at least 25% by wegiht of the mixture is comprised of siloxane groups.

Chain extenders, i.e., low equivalent weight polyahls which give rise to hard segments in the isocyanurate polymer are also optionally employed herein. The use of chain extenders to prepare conventional polyurethanes is well known and their use herein is according to conventional manner. Suitable chain extenders include the relatively low equivalent weight (i.e., less than about 2,000, preferably less than 200) polyols such as ethylene glycol, propylene glycol, 1,4-propane diol, diethylene glycol, tripropylene glycol, hydroquinone, catechol, resorcinol, dicyclopentadiene dimethanol glycerine, low molecular weight ethylene and/or propylene oxide derivatives of glycerine and the like. Suitable aliphatic amine containing chain extenders suitable herein, for example, ethylene diamine, 1,3-diaminopropane, 1,4-diaminobutane, diethylenetriamine, ethanolamine, hexamethylene diamine, methylaminobispropylamine, aminoethylpiperazine, tetraethylenepentamine, mixtures thereof and the like. Particularly suitable are aminated polyoxpropylene glycols having an average amino hydrogen equivalent weight of from about 60 to about 110. Also useful are (bis)hydroxyalkyl monosiloxanes, (bis)hydroxyalkyldisiloxanes, and similar low equivalent weight hydroxyl terminated siloxanes.

Suitable aromatic amine chain extenders include, for example, 2,4-bis(paraminobenzoline), aniline, 2,4-diaminotoluene, 2,6-diaminotoluene, 1,3-phenylenediamine, 1,4-phenylene diamine, naphthalene, 1,5-diamine, triphenylmethane, 4,4',4''-triamino, 1-methyl-2-methylamino-4-aminobenzene, 1,3,5-triethyl-2,6-aminobenzene and the like.

The chain extenders are advantageously employed in the amount from about 0 to 40 percent, preferably 0–25% by weight of the polyahls used.

Foams may be prepared according to the invention in various means. If desired, a blowing agent may be employed in the formulation in order to produce a low density product, i.e., a foam. Suitable blowing agents are described in U.S. Pat. Nos. 4,125,487 and 3,753,933. Particularly suitable blowing agents include low boiling halogenated carbons such as trichlorofluoromethane.

Water is also an effective blowing agent as it reacts with an isocyanate group to liberate carbon dioxide. The use of water as a blowing agent is generally accompanied by a catalyst for the urethane/water reaction, but often the isocyanurate and/or the urethane catalyst employed effectively catalyzes the water blowing reaction.

Another suitable method method for foaming the siloxane-modified polyisocyanurate is to inject or whip into the reaction mixture an inert gas such as air, nitrogen, oxygen, carbon dioxide, xenon, helium or mixtures thereof.

Because the use of the siloxane polyahl herein, it is not normally necessary to add a surfactant or other cell-control agent to the reaction mixture. However, it is known to use certain surfactants such as liquid organosiloxane to promote to formation of closed cells in the foams, and such surfactants are suitably employed herein if desired. In addition, the formation of either open or closed cell forms can be affected by the choice of siloxane polyahl. Those having terminal secondary hydroxyl groups tend to favor closed cell formation, whereas those containing terminal primary hydroxyl groups favor open cell formation.

Other optional components include, for example, coloring agents, density reducing agents, reinforcing agents, mold release agents, flame retardants, fillers, other modifiers, antioxidants and the like such are conventionally employed in polyurethane formulations.

Such optional components are advantageously blended with the siloxane polyahl before the reaction thereof with the polyisocyanate.

As stated hereinbefore, the product siloxane-modified polyisocyanurate may exhibit a wide range of properties depending on the particular components used as well as the isocyanate index. Soft flexible materials are prepared by using a relatively low isocyanurate index, i.e., about 80 to 400, preferably about 125 to 400.

By using a higher isocyanate index, harder, more resilient materials are prepared. Siloxane-modified isocyanurate elastomers and coatings of this invention can be prepared which are much harder than conventional siloxane polymers. Often, a Shore D hardness of 75 or even higher is obtained with the isocyanurate elastomer and coatings of this invention. By contrast, conventional silicone polymers seldom exhibit a Shore D hardness greater than about 55. Such elastomer also exhibits excellent oxidation stability.

Another surprising property of polyisocyanurate coatings of this invention is that despite their hardness, they exhibit excellent flexibility and impact strength. Even very hard samples often pass a 90° mandrel bend test (DSTM D-522) and exhibit a reverse impact strength (ASTM D-2794) of 120 in-lbs. or more. Reverse impact strengths of 130 to 160 in-lbs. are often achieved even with very hard polyisocyanurate coatings of this invention. Said coatings are generally of high gloss, and typically have a non-stick surface. Another advantage of these coatings is that they are easily prepared at 100% solids, i.e. no solvent or diluent is required to prepare the coatings.

In addition, the siloxane modified polyisocyanurate of this invention generally exhibits a highly smooth surface, except for foams, and is non-sticking to many materials.

The siloxane modified polyisocyanurate of this invention is surprisingly resistant to thermal degradation and solvents. The siloxane-modified polyisocyanurate exhibits substantially improved resistance to heat as compared to polyether polyisocyanurates. The polyisocyanurate of this invention, particularly that made with an aliphatic polyisocyanate often exhibits substantial heat resistant at temperatures as high as 350° C. or more. In addition the polyisocyanate is highly resistant to most organic solvents, and tends to swell very little therein. In particular, the siloxane-modified polyisocyanurate is very resistant to mixtures of oil and gasoline, making it excellent for use as internal combustion engine gaskets.

Films can be prepared according to this invention by coating the substrate with the siloxane polyahl either neat or as a solution and then reacting the polyahl with the polyisocyanate in-situ and drawing down the film. This technique is especially suitable when the components react rapidly at ambient temperatures. When the reaction proceeds more slowly, the polyahl and polyisocyanate may be premixed and then coated onto the substrate with subsequent curing.

The siloxane modified polyisocyanurate is useful, for example, in membranes, gaskets, medical supplies such as catheters and tubing, molded articles, potting compounds, water-resistant industrial coatings, high gloss light stable coatings, high resiliency coatings and wire insulation. Other uses will of course be readily apparent to those skilled in the relevant arts.

The following examples are provided to illustrate the invention but not to limit the scope thereof. All parts and percentages are by weight unless otherwise indicated.

EXAMPLE 1

To a 1,000 ml round bottom flask are placed 500 g of an α,ω-dihydroxy poly(ethyleneoxide-b-dimethylsiloxane-b-ethyleneoxide)polyahl having an equivalent weight of about 1,200 and containing 50 percent by weight poly(ethyleneoxide) blocks. This material is commercially available from Petrarch Systems, Inc., Bristol, Pa. This polyahl contains as an impurity about 256 parts per million potassium, which is a trimerization catalyst. The siloxane is heated overnight at 80° C. under 1 ml mercury vacuum to remove dissolved gasses. In similar manner, but separately, a like amount of 4,4'-methylenediphenylisocyanate (Isonate 143-L, available from Upjohn Company) is degassed. This diisocyanate has an equivalent weight of about 143.

In a polypropylene beaker are mixed with stirring at room temperature 100 parts of the degassed siloxane and 100 parts of the degassed isocyanate (960 isocyanate index). The mixture is stirred manually for about 15 seconds and poured into a 9"×9"×⅛" window mold which has previously been treated with a mold release agent. The mold is closed and placed into a heated press at 50° C. for 30 minutes. The resulting elastomer is removed, demolded and placed in a hot air oven at 110° C. for 60 minutes. This sample is referred to herein as Sample No. 1-A. Sample No. 1-A is analyzed using attenuated total reflectance infrared spectroscopy. This spectrum exhibits a very strong peak in the 1,400 cm$^{-1}$ range. This peak indicates the presence of the isocyanurate groups. The siloxane modified polyisocyanurate is evaluated using differential scanning colorimetry (DSC) and thermogravometric analysis (TGA) which indicate that the polymer is thermally stable up to almost 300° C. and has good dynamic mechanical properties in the range from −120° C. to 180° C. This temperature range is broader than that of most polyurethanes or polysiloxanes.

The ultimate tensile stress and strain, Young's modulus, breaking working energy, notched impact strength (Izod), Shore A and D hardness, and flexural modulus are determined for Sample No. 1-A and are as reported in Table I following.

The foregoing procedure is repeated except the siloxane modified polyisocyanurate is prepared using an isocyanate index of 192. A flexible soft elastomer is obtained which is referred to herein as Sample No. 1-B. This sample exhibits an isocyanurate peak at 1,400 cm$^{-1}$ in its infrared spectrum. Again, good thermal stability is seen. The physical properties of this elastomer are reported in Table I following.

TABLE I

Mechanical Properties of Siloxane Modified Polyisocyanurate

| | Sample No. 1A | Sample No. 1B |
|---|---|---|
| Ultimate Tensile[1] Stress (psi) | 4428 | 80[6] |
| Ultimate Tensile[1] Strain (percent) | 9.4 | 18.1[6] |
| Young's Modulus[1] (psi) | 140,000 | 540 |
| Breaking Working[2] Energy (psi) | 316.3 | 11.4 |
| Izod (notched)[3] (ft" lb/in) | 0.57 | —[7] |
| Shore A Hardness[4] | +95 | 55 |
| Shore D Hardness[4] | 73 | 16 |
| Flexural Modulus[5] (psi) | 240,000 | 26,000 |

[1]ASTM D-638
[2]ASTM D-671
[3]ASTM D-256
[4]ASTM D-2240
[5]ASTM D-790
[6]Sample did not break
[7]Sample too flexible to measure It is seen that Sample 1A has generally good tensile and flexural properties as well as excellent hardness. Sample No. 1B, on the other hand, exhibits physical properties characteristic of and desirable in soft flexible polymers.

EXAMPLE 2

Into a polypropylene container are added 100 parts of degassed siloxane polyahl as used in Example 1. To this polyahl are added 3 parts potassium octoate catalyst and 200 parts (1510 index) Desmodur N-100 ®, a trifunctional isocyanate available from Mobay Chemical Corporation, having the structure

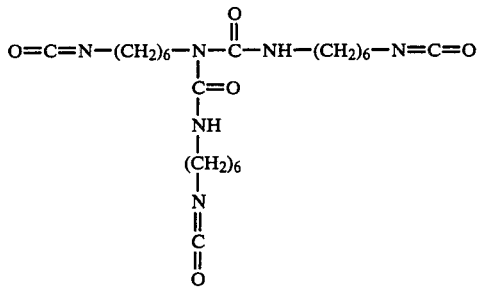

This mixture is molded as described in Example 1. The resulting polymer is a hard elastomer which upon analysis reveals a substantial peak at 1,400 cm$^{-1}$ indicating the presence of isocyanurates.

This experiment is repeated, this time using an isocyanate index of about 375. The resulting elastomer is soft and flexible and exhibits an isocyanurate peak in its IR spectrum.

EXAMPLE 3

A 100 part portion of degassed siloxane polyahl as described in Example 1 is placed in a polypropylene container. To this are added 100 parts of 4,4'-methylenediphenylisocyanate. The mixture is stirred for about 15 seconds and a film cast onto a baked epoxy primed metal surface and drawn down using a No. 24 Meyer wire rod. The coating was then placed in an oven at 100° C. for 30 minutes.

A flexible film is readily prepared in like manner, with the same components, using a isocyanate index of approximately 190. A very soft film is prepared.

EXAMPLE 4

Frothed Foams

In a polypropylene beaker are placed 100 parts of a siloxane polyahl as described in Example 1 except that it is not degassed. To the polyahl is added, with stirring, 2 parts of potassium peroctoate catalyst. Then 200 parts of Desmodur N100 polyisocyanate (1264 index) are added and the mixture is stirred for approximately 20 seconds in order to whip air into the mixture. The mixture is then placed in an oven at 80° C. where it is allowed to rise. The sample is left in the oven for a total of 60 minutes. A rigid foam is obtained.

A flexible foam is prepared in like manner except that only 75 parts of the aliphatic diisocyanate (474 index) is used. This foam is relatively soft and flexible.

EXAMPLE 5

Water Blown Flexible Foam

Into a polypropylene beaker is weighed 150 g of the siloxane polyol described in Example 1. To the beaker are added, with stirring, 1.0 g water and 0.4 g stannous octoate catalyst. Then, with contained stirring, is added 24.3 g Isonate 143-L (a liquid methylene diphenyldiisocyanate mixture). In about 15 seconds the reaction mixture turns transparent and then cream colored. At this point the mixture is poured into a wide mouth container, where it rises in about 90 seconds to form a fine, open celled foam. After 10 minutes, the foam cures without collapsing to a tack-free state. The product foam is a highly resilient, low load-bearing foam.

EXAMPLE 6

Foam Blown with a Fluorinated Hydrocarbon

Into a polypropylene beaker is weighed 150 g of the siloxane polyol described in Example 1. To the beaker are added, with stirring, 0.4 g potassium octoate and 6 g $CCl_3F$. To this mixture is then added, with stirring 50 grams Isonate 143-L. Cream time is approximately 22 seconds. The reaction mixture is poured into a wide mouth container and permitted to foam. Rise time is about 80 seconds and after 90 seconds a rigid, tack-free foam is obtained.

What is claimed is:

1. A siloxane-modified isocyanurate polymer comprising the reaction product of a reaction mixture comprising (a) a siloxane-containing polyahl having at least 2 primary or secondary amine groups or hydroxyl groups other than Si—O—H groups per molecule or a polyahl mixture comprising said siloxane-containing polyahl in an amount such that such mixture contains at least about 10% by weight of siloxane groups, (b) a polyisocyanate and (c) a catalyst for the trimerization of isocyanate groups to isocyanurate groups.

2. The siloxane-modified isocyanurate polymer of claim 1 wherein the siloxane-containing polyahl is represented by the structure

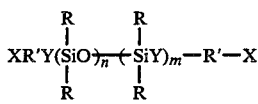

wherein n is an integer from about 1 to 10,000, each R is independently hydrogen, lower alkyl, benzyl or phenyl, Y is a covalent bond, —O—, —S—, —COO— or other linking group, m is 0 or 1, X is a functional group containing at least 1 active hydrogen atom and each R' is independently an inertly substituted organic diradical.

3. The siloxane modified isocyanurate of claim 2 wherein each X is hydroxyl, primary amine or secondary amine.

4. The siloxane modified isocyanurate polymer of claim 3 wherein m is 0, Y is —O— and R' is a poly(oxyalkylene) chain.

5. The siloxane modified isocyanurate polymer of claim 4 wherein the poly(oxyalkylene) chain is a polymer of ethylene oxide, propylene oxide or mixture thereof.

6. The siloxane modified isocyanurate of claim 4 wherein the siloxane-containing polyahl has a siloxane content of about 25 to 95 percent by weight.

7. The siloxane modified isocyanurate polymer of claim 2 wherein the polyahl mixture contains from about 25 to 100 percent by weight of the mixture of said siloxane-containing polyahl.

8. The siloxane modified isocyanurate polymer of claim 1 wherein the polyisocyanate is an aromatic polyisocyanate.

9. The siloxane modified isocyanurate polymer of claim 8 wherein the aromatic polyisocyanate is tolylene diisocyanate.

10. The siloxane modified isocyanurate polymer of claim 8 wherein the aromatic polyisocyanate is a methylene-bridged polyphenyl polyisocyanate.

11. The siloxane modified isocyanurate polymer of claim 1 wherein the polyisocyanate is an aliphatic polyisocyanate.

12. The siloxane modified isocyanurate polymer of claim 1 wherein the polyisocyanate is employed in an amount such that the isocyanate index is from about 80 to 400.

13. The siloxane modified isocyanurate polymer of claim 1 wherein the polyisocyanate is employed in an amount such that the isocyanate index is from about 400–700.

14. The siloxane modified isocyanurate of claim 1 wherein the polyisocyanate is employed in the amount such that the isocyanate index is from about 700 to 2,000.

15. The siloxane modified isocyanurate polymer of claim 1 wherein the reaction mixture further comprises a blowing agent.

16. The siloxane modified isocyanurate of claim 1 wherein the reaction mixture further comprises a chain extender.

17. A film comprising the siloxane modified isocyanurate of claim 1.

18. A foam comprising the siloxane modified isocyanurate polymer of claim 15.

19. An elastomer comprising the siloxane modified isocyanurate polymer of claim 1.

* * * * *